US012704851B2

(12) United States Patent
De Ornelas Flor et al.

(10) Patent No.: US 12,704,851 B2
(45) Date of Patent: Aug. 11, 2026

(54) RFID SYSTEM FOR IDENTIFYING EQUIPMENT AND POSITIONING AUTONOMOUS VEHICLES IN AN UNDERWATER ENVIRONMENT

(71) Applicant: PETRÓLEO BRASILEIRO S.A.—PETROBRAS, Rio de Janeiro (BR)

(72) Inventors: Alfredo De Andrade De Ornelas Flor, Rio de Janeiro (BR); Antonio Jose Perez Rodrigues De Britto, Rio de Janeiro (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 45 days.

(21) Appl. No.: 18/904,383

(22) Filed: Oct. 2, 2024

(65) Prior Publication Data

US 2025/0117017 A1 Apr. 10, 2025

(30) Foreign Application Priority Data

Oct. 5, 2023 (BR) .......................... 1020230206026

(51) Int. Cl.
*G05D 1/244* (2024.01)
*B63G 8/00* (2006.01)
(Continued)

(52) U.S. Cl.
CPC ............. *G05D 1/244* (2024.01); *B63G 8/001* (2013.01); *G05D 1/246* (2024.01);
(Continued)

(58) Field of Classification Search
CPC ............... G05D 1/246; G05D 2105/89; G05D 2109/38; G05D 2111/34; G05D 2107/27;
(Continued)

(56) References Cited

U.S. PATENT DOCUMENTS 11,807,349 B1 * 11/2023 Schumann ........... G05D 1/2446
2011/0095865 A1 * 4/2011 Harasti ..................... G01S 1/68
340/10.1

(Continued)

FOREIGN PATENT DOCUMENTS

CN 103310249 9/2013
KR 101496446 B1 * 3/2015 ............. G06K 17/00
WO 2015194911 12/2015

OTHER PUBLICATIONS

KR 101496446 B1, Kim et al., "System for managing of Submarine Cable Using by Recognization Radio Frequency and Method Thereof", English Translation (Year: 2015).*

(Continued)

*Primary Examiner* — Jason Holloway
*Assistant Examiner* — Benjamin J Brosh
(74) *Attorney, Agent, or Firm* — Womble Bond Dickinson (US) LLP

(57) ABSTRACT

This disclosure relates to embodiments of a radio frequency identification (RFID) system. An embodiment includes a reader/recorder (active element) in autonomous robotic underwater vehicles (AUVs) and an identifying TAG (RFID) (passive element) with memory for recording an ID (identification/code). The ID is read by the reader/recorder and immediately updates its position and identification of the equipment, system, or underwater pipeline for inspection by AUVs. TAGs are placed on equipment, pipelines, and existing underwater materials in the oil field area by the AUVs themselves, or onshore. For positioning and inspections, the codes of these RFID TAGs are linked to their location in the underwater oil field at its facility.

12 Claims, 2 Drawing Sheets

(51) Int. Cl.

| | |
|---|---|
| ***G05D 1/246*** | (2024.01) |
| ***G06K 7/10*** | (2006.01) |
| ***G06K 19/07*** | (2006.01) |
| *G05D 105/80* | (2024.01) |
| *G05D 107/00* | (2024.01) |
| *G05D 107/70* | (2024.01) |
| *G05D 109/30* | (2024.01) |
| *G05D 111/30* | (2024.01) |

(52) U.S. Cl.

CPC ..... *G06K 7/10297* (2013.01); *G06K 7/10376* (2013.01); *G06K 19/0723* (2013.01); *B63G 2008/004* (2013.01); *G05D 2105/89* (2024.01); *G05D 2107/27* (2024.01); *G05D 2107/73* (2024.01); *G05D 2109/38* (2024.01); *G05D 2111/34* (2024.01)

(58) Field of Classification Search

CPC ................ G05D 2107/73; B63G 8/001; B63G 2008/004; G06K 7/10297; G06K 7/10376; G06K 7/10386; G06K 19/0723; G01S 1/022

See application file for complete search history.

(56) References Cited

U.S. PATENT DOCUMENTS

| | | | | |
|---|---|---|---|---|
| 2011/0291854 | A1* | 12/2011 | Morley | H04B 5/77 340/850 |
| 2016/0124105 | A1* | 5/2016 | Valsvik | B63G 8/001 367/15 |
| 2016/0300089 | A1* | 10/2016 | Arsenault | G06K 7/10356 |
| 2017/0072563 | A1* | 3/2017 | Anderson-Sprecher | B25J 9/1664 |
| 2019/0223272 | A1* | 7/2019 | Pohl | B63G 8/001 |
| 2019/0265378 | A1 | 8/2019 | Meech et al. | |
| 2020/0298949 | A1* | 9/2020 | Gerard | H04L 9/3213 |
| 2021/0031891 | A1* | 2/2021 | Englot | B63G 8/001 |
| 2024/0142992 | A1* | 5/2024 | Dalla Libera | G05D 1/244 |
| 2024/0346278 | A1* | 10/2024 | Wilkinson | G06K 19/07758 |

OTHER PUBLICATIONS

Tunon et al., "Underwater Robot Navigation for Maintenance and Inspection of Flooded Mine Shafts", Date added to IEEE (publish) Jan. 6, 2019, retrieved from web, URL: <https://ieeexplore.ieee.org/document/8594445> (Year: 2019).*

Chan et al., "Chapter 10: Other Existing Positioning Systems", Copyright year (publish) 2012, retrieved from web, URL: <https://ieeexplore.ieee.org/document/6241180/authors#authors> (Year: 2012).*

* cited by examiner

RFID SYSTEM FOR IDENTIFYING EQUIPMENT AND POSITIONING AUTONOMOUS VEHICLES IN AN UNDERWATER ENVIRONMENT

FIELD OF THE DISCLOSURE

The present disclosure applies to the activities of Oil and Gas Industry. Preferably, the disclosure refers to submerged systems, equipment and pipelines identified by the underwater radio frequency identification (RFID) TAG installation, and which are targets of routine inspection by underwater vehicles of the type AUV (Autonomous Underwater Vehicle), equipped with RFID Read/Record technology.

BACKGROUND OF THE DISCLOSURE

It is current knowledge that the identification of systems, equipment and pipelines in oil underwater production systems is essential to guarantee the safe and efficient operation of the facilities. There is a lot of technologies available to conduct this identification, so that the selection of the appropriate technique depends on the specific needs of the project, the conditions of the underwater environment, and the available budget. In many cases, a combination of several technologies can be used to ensure complete and accurate identification of underwater oil installations at depths of up to 3,000 meters.

In this context, among the most common techniques used in the offshore oil and gas industry there are underwater markers that are often used in pipelines and underwater cables to provide information about the location and purpose of a structure or pipeline, in addition to of submerged markers, which may include buoys, identification plates, or engraved metal plates. The systems of GNSS (Global Navigation Satellite System) positioning, like GPS, can be used to track the accurate position of vessels, for underwater equipment and surface structures, thus allowing accurate identification of underwater installations. Another technique used is inspection remotely operated by ROV, the ROVs being remotely controlled vehicles and frequently used to inspect and identify underwater structures. The use of sonar is also well known, as it is a detection technology through sound waves. There is also tracking by autonomous underwater vehicles (AUVs), which can be programmed to conduct specific missions, including identifying underwater structures, so they are usually equipped with advanced sensors and mapping systems. There are other techniques that use non-destructive inspection technologies (NDT), to identify the state and integrity of underwater equipment and pipelines. NDT techniques, such as ultrasound, underwater radiography, inspection by magnetic particles and eddy currents, can be applied. Furthermore, RFID (Radiofrequency Identification) Marking, such as the use of RFID TAGs, attached to equipment and pipelines to allow easy identification and the tracking of underwater assets. RFID readers can be used to read these TAGs during inspections and maintenance. There are other techniques that use some telemetry and monitoring systems, such as underwater sensors and telemetry systems, which can be implemented to continuously monitor the integrity and performance of underwater equipment and structures, providing real-time data for identification and taking of decisions. High-resolution underwater mapping, such as undersea LIDAR and high-resolution imaging systems, can be used to create detailed maps of structures and underwater equipment, among other techniques.

Particularly, the identification of structures, systems, equipment, and pipelines in underwater oil production systems at depths of up to 3,000 meters shows a number of significant challenges due to the hostile environment and extreme conditions found in depths of the ocean. The main difficulties are indicated below.

Extreme pressure, since at high depths the water pressure is extremely high, which can make the operation of equipment and sensors difficult, so that underwater equipment needs to be designed to withstand these extreme pressures.

Another difficulty encountered is the low visibility in the depths of the ocean, which is often limited due to lack of sunlight, where depending on the depth and location, total darkness can be a problem.

Another aspect that is challenging is the extreme temperatures of water at great depths (4° C.), which can vary significantly and be extremely low, affecting the performance of electronic equipment and sensors.

There are also problems regarding very strong oceanic currents at great depths, making it difficult to operate underwater vehicles and stability during inspections.

Furthermore, there are sediments and debris at the bottom of the sea, which can hide structures and equipment, in addition to sediment movements can bury or expose equipment over time.

In addition, there is marine biology, such as corals and organisms that grow in these structures, which can make it difficult to identify and inspect underwater equipment.

Other difficulties are related to sound distortions at extreme depths, the sound wave propagation being affected, which can cause deformations in sonar images and make it difficult to accurate identification of objects.

Another challenge is limited access, as the large depth makes physical access to underwater facilities very challenging. Autonomous underwater vehicles (AUVs) for inspection and identification adds complexity to operations, as the vehicle does not have a communication and targeting cable, requiring the use of points of reference for its self-positioning on the field, which can be achieved by RFID tags, which by code and positioning on the digital map in the AUV confirm its positioning in the oil field.

Another aspect to be considered is the degradation of submerged materials, which are subject to corrosion and deterioration over time due to exposure to sea water and extreme pressure and temperature conditions. Finally, there are difficulties with long distances and limited communication at extreme depths, the communication with underwater equipment being challenging, due to the long distances involved and the limitations of signal transmission through water.

As stated, inspections and maintenance in the underwater environment at a depth of 3,000 meters are made with special underwater vehicles, such as AUVs. The autonomous underwater vehicle (AUV) is launched by a vessel at a certain depth of sea in a "garage" where there is an electrical cable connection to charge its batteries and communication with the oil platform. Such a vehicle is programmed to travel through a region, within its specific autonomy area in the oil field, to make inspections and checks, photos and films of equipment and systems. However, as previously mentioned, stronger sea currents and unforeseen obstacles can take it off course, making it difficult to control and sometimes forcing him to go to the surface to regain positioning, resulting in lost time and elevated costs in AUV operation. In view of the above, the present disclosure solves the problem of loss of reference autonomous robotic vehicles that end up getting lost or having to rise to the surface to locate itself.

This disclosure shows a system of structure recognition with identification by TAGs RFID, in order to solve some difficulties highlighted and facilitate the work of AUVs. In particular, the system is based on reading RFID TAGs made by AUVs, which require safe proximity to the reader/recorder close to the TAG, so as not to cause damage to the structure or the TAG.

In this sense, the present disclosure solves the problem mentioned above with RFID technology composed of a reader/recorder system that will be in the AUVs, and the TAG (RFID) being a passive element that has a memory for the required ID recording (ID is the identification of the equipment and its code). The ID being read by the reader/recorder will immediately update the position and identification of the equipment, system, or pipeline, for inspection. Specifically, the use of RFID technology will allow greater accuracy in driving and locating the autonomous robotic vehicle through the positioning of the TAG in the oil exploration field. In other words, the present disclosure applies to RFID technology, already developed for inventory control, identification of people, equipment, and materials, for use as an additional factor of AUV positioning.

Additionally, the RFID system of the present disclosure is based on two pieces of equipment: the first, active, reading/recording and the second passive, the TAG where the identification information, characteristics and equipment and material codes are stored. Part of these TAGs identifiers are placed on the surface, on the vessel or at the port at the time of installation of equipment, pipelines, and materials. The remaining TAGs will be installed by AUV in equipment and other underwater systems existing in the oil field area from 2,000 to 3,000 meters depth, for positioning and inspection purposes, which will be able to provide adequate guidance to AUVs in an underwater area. The reader/recorder transmits a radio frequency specific protocol, in the range of 100 to 300 kilohertz (KHz) for the TAG (FIG. 2). The TAG is energized by the electromagnetic field received by its antenna and returns, through of a protocol, its identification and code, also in radio frequency, to the AUV reader/recorder (FIG. 3). The RFID system of the present disclosure allows reading of TAG information in the submerged area is made from 60 to 120 cm away, so that there is no contact or collision between the AUV during ID reading, making it easier to read the TAG in safe distance for structures and AUVs.

STATE OF THE ART

In the State of the Art there are approaches developed that seek to solve technical problems previously described.

Specifically, noting the limitations of the State of the Art, the present disclosure solves such problems with developing an RFID system to that AUVs can position themselves with the TAGs already installed on the surface and also install and record data to TAGs on other or new submerged equipment, systems and/or pipelines, for the identification of structures and their location within the oil exploration field, so that TAGs will be installed from 2,000 to 3,000 meters of depth. Due to the difficulty of identifying and positioning of AUVs at great depths, therefore do not have an operating cable like ROVs, there is a need of installing some TAGs on the surface, which will be positioning points for AUVs. Once these TAGs are installed, the AUV will be able to position themselves through them in the underwater exploration field, being able to identify equipment and install other TAGs on other equipment, such as pipelines and underwater risers.

Patent document US 2019265378 A1, for example, provides a system, an apparatus, and a method for individually identifying, handling, tracking, implementing, and recovering a plurality of seismic nodes by an underwater vehicle for underwater operations. The implementation, positioning and recovery of seismic nodes of and from the seabed can be automatically managed by software and/or manually automated by a ROV operator. The disclosed system can be coupled to a ROV navigation system. The node identification system tracks the position of each seismic node (associated with a unique number identification) within each tray, or other node support at all times, whether the tray is located on board of a surface vessel, within of a ROV, inside an underwater basket, or at the seabed. The identification system is configured to track, select, implement, and recover a given seismic node by its unique identification number.

Patent document CN 103310249 A describes a underwater tour guidance system, comprising an RFID (radio frequency identification devices) tag of low frequency (LF) implanted in a living marine body, a reader-recorder, and an output device, wherein the low-frequency (LF) RFID tag establishes connection with the reader-recorder through a radio frequency signal, and the reader-recorder is connected to the output device in wired or wireless mode. The output device may be a fixed display or a portable set. The fixed display device includes a receiver and transmitter module, a processor, a memory, and a display. The receiver and transmitter module, processor, memory, and display are connected in sequence, and the reader-recorder is connected to the receiver and transmitter module in wired or wireless mode. The portable set includes a receiver and transmitter module, a processor, a memory, and a display module. The receiver and transmitter module, the processor, the memory, and the display module are connected in sequence, and the reader-recorder is connected to the receiver and transmitter module of the portable set in wired or wireless mode.

Patent document WO 2015194911 A discloses an underwater cable management system to which a radio frequency identification system (RFID) is applied and a method for this. An underwater cable management system comprises: an underwater cable including several RFID TAGs to store underwater cable management information including location information at which the underwater cable is installed under water and exclusive information of a label; and an underwater cable management device to manage the underwater cable, in which the underwater cable management device includes a RFID reader to read underwater cable management information from an RFID TAG included in the underwater cable, a control unit to analyze the underwater cable management information received through the reader RFID to calculate the location at which the RFID tag is installed and display a processing result to display the corresponding location on a map by linking to location calculated from map data, and a display unit to display the location at which the RFID TAG was installed on the map, according to the control of the control unit.

The present disclosure differs from the State of the Art, since it relates to a system applied to underwater areas from 2,000 to 3,000 meters deep and, due to the higher operating cost of another type of underwater robotic vehicle, ROV, is aimed only at autonomous underwater robotics vehicles (AUVs). Specifically, the reference and confirmation points for AUVs are points of RFID TAGs of equipment that have positioning within of the oil field.

BRIEF DESCRIPTION OF THE DISCLOSURE

The present disclosure relates to a RFID TAG system for identifying equipment, among others, and the positioning of autonomous vehicles (AUVs) in an underwater environment comprising two devices. In RFID TAGs characteristic identification information and equipment and material codes are stored, in the given oil field area at depths of 2,000 to 3,000 meters, by AUVs or onshore, before the RFID TAGs are installed in the underwater environment. Each RFID TAG has a code that is linked to its positioning in the underwater oil field and included in the AUV digital map. The positioning of the AUV is always updated whenever it finds an RFID TAG and reads its code. The system allows the reading of information from said TAG in a submerged area of the seabed to be conducted at a safe distance of 60 to 120 cm from the equipment, without contact or collision of the AUV on the structure, for reading an identification code. The AUV is equipped with a reader/recorder and transmits a specific protocol in radio frequency, in the range of 100 to 300 KHz for said TAG (FIG. 2). The TAG is energized by the electromagnetic field received and returns, through a protocol, its identification and code, also in radio frequency, for the AUV reader/recorder (FIG. 3).

Underwater TAGs will operate at low RF frequencies due to the 1 W (30 dBm) attenuation that the sea water with a salinity of 35 ppm promotes in the electromagnetic waves. Due to electromagnetic transmission losses inside saline water (35 ppm salt), the high frequency losses are very large. The smaller frequency, the lower the loss. This is solved by increasing reader/recorder power for a range of 5 W (150 dBm), or greater, to compensate for attenuation and increase reading distance to a safe space, avoiding collision proximity of the AUV with the TAG. The electromagnetic coupling of the reader with the TAG will be made using high gain antennas, both of the reader and in TAG. The encapsulation will be in material suitable for non-attenuation of electromagnetic waves, such as boron silicate glass and other plastic materials that can be used to withstand high depths.

BRIEF DESCRIPTION OF THE DRAWINGS

In order to complement this description and to obtain a better understanding of the features of this disclosure, and according to an embodiment of which, in annex, is presented a set of figures in which, in an exemplifying way, although not limiting, represents its preferred embodiment.

DETAILED DESCRIPTION OF THE DISCLOSURE

Specifically, the system of the present disclosure is applied to AUVs, which are underwater autonomous robotic systems, and do the job without human interference, have no communication cables and, therefore, the need for reference points, with RFID TAGs to find its positioning from 2,000 to 3,000 meters deep. The equipment and systems that can be identified with TAGs on the surface or installed in the field allow a positioning principle of these equipment in the oil exploration field for the AUV.

Specifically, the RFID system of the present disclosure consists of an active reader/recorder, which is used connected to the AUV to access passive TAGs installed for identification, which are equipment where the system equipment or pipeline identification or code is recorded. The active reader/recorder is in the autonomous robotic vehicle and transmits the positioning of these TAGs, inserted into the map of the oil exploration field or area to be searched that have these TAGs.

The use of the RFID system in identification of various underwater items of equipment, including pipelines, equipment and systems as will be understood by those skilled in the art enables reference points (RFID) in the area for the autonomous robotic vehicle to carry out an inspection of equipment, said vehicle goes directly to the equipment and confirms, by identification of the RFID code, whether it is really the equipment to be inspected. If there is an event that the AUV leaves the route, it can search, through the reading equipment, any nearest RFID identification and position itself digitally with its area map and go to the required location for inspection. In addition to making these inspections more agile saving time, the system can be programmed for several inspections, optimizing the shortest route, and saving operation time/cost through the use of RFID TAGs as positioning indicators in the inspection area.

In this way, the system is used in underwater autonomous robotics vehicles, AUVs, or anything else that need to position itself in an area where submerged systems, equipment and pipelines identified with TAGs are routine inspection targets of these vehicles.

Figure 1:
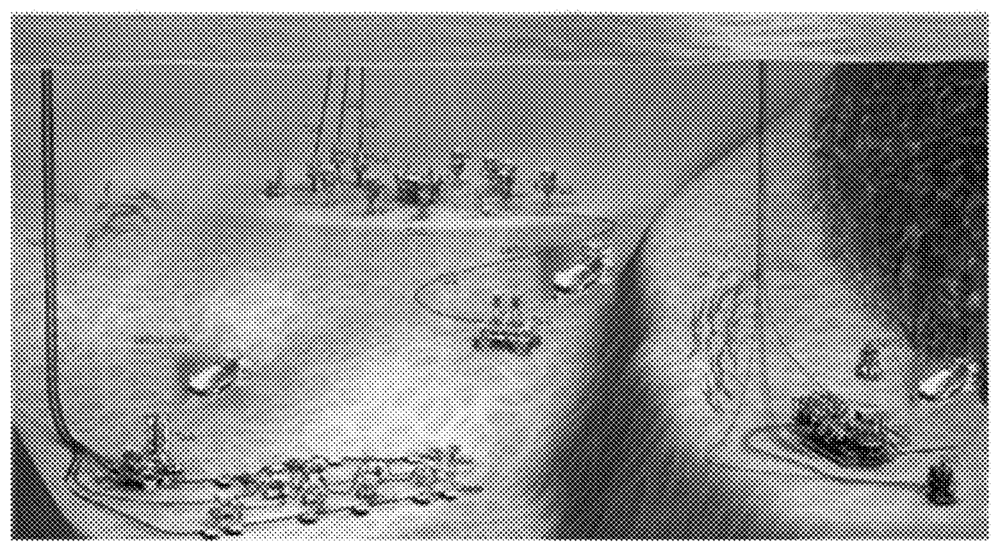
In FIG. 1 there is a representation of the RFID for equipment identification and positioning of autonomous robotic vehicles in an underwater environment, according to an embodiment of the present disclosure.
Figure 2:
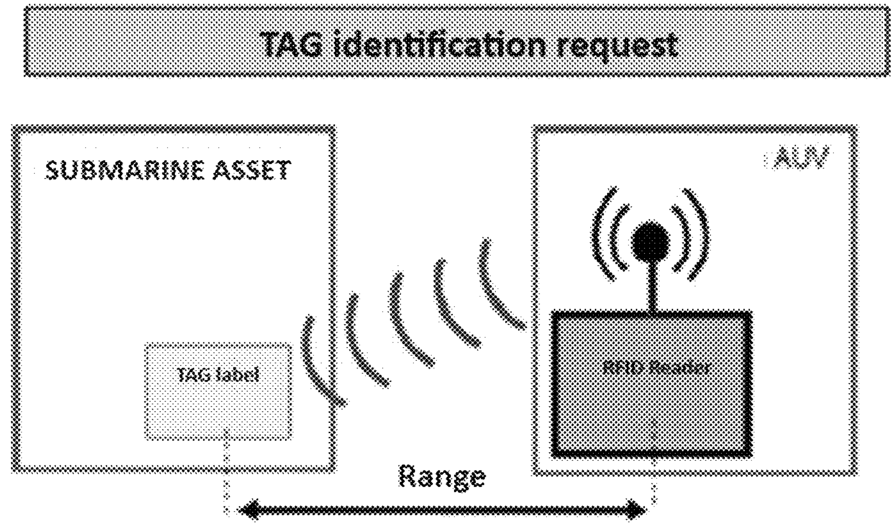
In FIG. 2 there is the request from identification of the TAG performed by the active device, RFID reader integrated into the AUV, according to an embodiment of the present disclosure.
Figure 3:
In FIG. 3, there is the receipt of the identification of the TAG conducted by the passive device, the TAG label, attached to an underwater asset, in accordance with an embodiment of the present disclosure.
Figure 3:
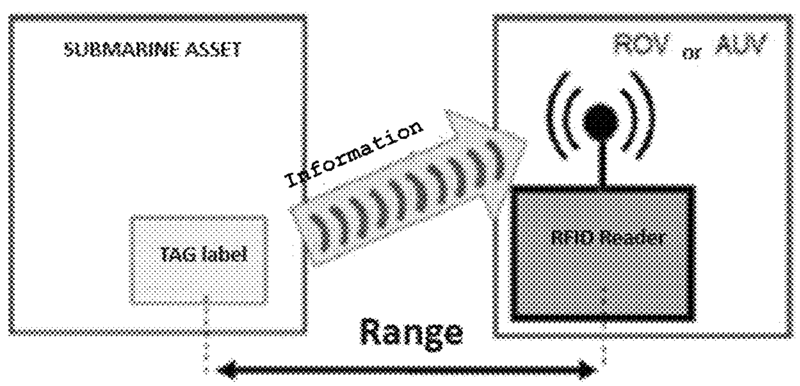
Figure 4:
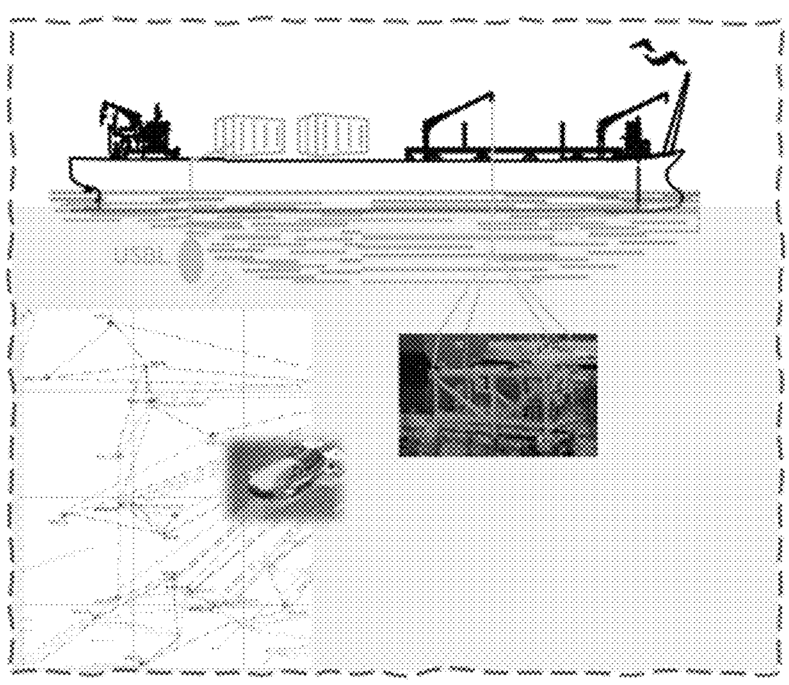
In FIG. 4 there is the digital map of the AUV showing the code connection of each RFID TAG to its positioning within the underwater oil field, in accordance with an embodiment of the present disclosure.

Therefore, RFID technology, which is already used for stock control, identification of people to entry into restricted areas, equipment, and systems, was improved and is being used in the system of the disclosure to be used at greater depths of up to 3,000 meters for positioning autonomous robotic vehicles in underwater areas with equipment with RFID TAG. An area with multiple RFID TAGs on an underwater map, with the positioning of each relative to that of the autonomous robotic vehicle, guarantees the positioning of this vehicle wherever there is a TAG (FIG. 4).

The invention claimed is:

1. A radio frequency identification (RFID) system for identifying equipment and positioning autonomous underwater vehicles (AUVs) in a deep sea underwater environment, the system comprising:

two separate devices, the first device being an active equipment, reader/recorder integrated into one or more AUVs, and the second device being one or more passive equipment RFID tags (TAGs) positioned to be associated with one or more items of equipment when positioned in the deep sea underwater environment, wherein identification information associated with the one or more TAGS includes stored characteristics, equipment, and material codes, which are linked to a digital positioning map for AUV inspections when in areas of the deep sea underwater environment, wherein the identifying TAGs are positioned by the one or more AUVs when in the deep sea underwater environment, or onshore prior to positioning the equipment in the deep sea underwater environment, in one or more predetermined objects in an oil field of a selected depth of 2,000 meters or deeper in the deep sea underwater environment, and wherein power of the active equipment, reader/recorder is increased to 5 W or greater when the one or more AUVs is positioned adjacent the oil field at the selected depth in the deep sea underwater environment.

2. The system according to claim 1, wherein the system is configured to read information from the one or more identifying TAGs in a submerged area on a seabed to be carried out 60 centimeters (cm) to 120 cm away from the equipment, without contact or collision of the one or more AUVs on a structure to read an identification (ID) from the one or more identification TAGS.

3. The system according to claim 2, wherein carrying out the identification of TAGS at 60 centimeters (cm) to 120 cm away from the equipment compensates for attenuation caused by salinity of deep sea water.

4. The system according to claim 1, wherein the active equipment reader/recorder transmits a specific protocol in radio frequency, in the range of 100 kilohertz (KHz) to 300 KHz, for the one or more TAGs.

5. The system according to claim 4, wherein each of the one or more TAGs is energized by an electromagnetic field received and returned, through transmission by means of a protocol also in radio frequency, its identification and code transmitted to the one or more AUVs reader/recorder, and wherein the one or more items of equipment includes one or more pipelines.

6. The system according to claim 1, wherein each of the one or more TAGs is energized by an electromagnetic field received and returned, through transmission by means of a protocol in radio frequency, its identification and code transmitted to the one or more AUVs reader/recorder.

7. The system according to claim 1, wherein increasing the power of the active equipment, reader/recorder to 5 W or greater compensates for attenuation caused by salinity of deep sea water.

8. The system according to claim 1, wherein increasing the power of the active equipment, reader/recorder to 5 W or greater compensates for frequency losses caused by salinity of deep sea water.

9. A radio frequency identification (RFID) system for identifying equipment and positioning autonomous underwater vehicles (AUVs) in a deep sea underwater environment, the system comprising:

two devices, the first device being an active equipment, reader/recorder integrated into one or more AUVs, and the second device being one or more passive equipment RFID tags (TAGs) positioned to be associated with one or more items of equipment when positioned in the deep sea underwater environment, wherein each of the one or more TAGS is configured to be read at a radio frequency range of 100 kilohertz (KHz) to 300 KHz when positioned in the deep sea underwater environment, wherein identification information associated with the one or more TAGS includes stored characteristics, equipment, and material codes, which are linked to a digital positioning map for AUV inspections in underwater areas, wherein the one or more items of the active equipment, reader/recorder are positioned in a selected underwater sea depth of 2000 meters or below, and wherein the power of the active equipment, reader/recorder is increased to 5 W or greater when in the deep sea underwater environment at a preselected depth.

10. The system according to claim 9, wherein the reader/recorder equipment transmits a specific protocol in radio frequency for the one or more TAGs.

11. The system according to claim 10, wherein the system is configured to read information from the one or more identifying TAGs in a submerged area on the seabed to be carried out 60 centimeters (cm) to 120 cm away from the equipment, without contact or collision of the one or more AUVs on the structure to read an identification (ID) from the one or more TAGS, and wherein the AUV follows a selected route along the map for locating and reading/recording the one or more TAGS.

12. The system according to claim 11, wherein each of the one or more TAGs is energized by an electromagnetic field received and returned, through transmission by means of a protocol also in radio frequency, its identification and code corresponding to the one or more AUVs reader/recorder, and wherein the one or more items of equipment includes one or more pipelines.

* * * * *